United States Patent
Zhu

Patent Number: 5,757,668
Date of Patent: May 26, 1998

[54] DEVICE, METHOD AND DIGITAL VIDEO ENCODER OF COMPLEXITY SCALABLE BLOCK-MATCHING MOTION ESTIMATION UTILIZING ADAPTIVE THRESHOLD TERMINATION

[75] Inventor: Qin Fan Zhu, Mansfield, Mass.

[73] Assignee: Motorola Inc., Schaumburg, Ill.

[21] Appl. No.: 449,178

[22] Filed: May 24, 1995

[51] Int. Cl.$^6$ .......................... G06K 15/00; G06F 17/60; H01J 13/00
[52] U.S. Cl. ................. 364/514 R; 348/402; 395/200.18
[58] Field of Search ..................................... 348/402, 405, 348/407, 416, 699, 415, 409, 401, 400; 364/514 A, 514 B, 514 C, 514 R; 395/20.18; 358/105

[56] References Cited

U.S. PATENT DOCUMENTS

| | | | |
|---|---|---|---|
| 5,040,062 | 8/1991 | Knguer et al. | 358/141 |
| 5,043,808 | 8/1991 | Knauer et al. | 358/133 |
| 5,200,820 | 4/1993 | Gharavi | 358/105 |
| 5,329,318 | 7/1994 | Keith | 348/699 |

OTHER PUBLICATIONS

U. Thonnesssen, D. Ernest, H. Grob, "Development of a Segment-Based Description of Events in Image Sequence".
Zoran S. Bojkovic, "Bit Rate Reducton in Digital Video Telephony For ISDN Application", 1991 IEEE.
"Advances In Picture Coding", Hans Georg Musmann, Peter Pirsch, and Hans–Joachim Grallert, Proceedings of the IEEE, vol. 73, No. 4 Apr., 1995 pp. 523–530.
"A Comparison of Techniques for Estimating Block Motion in Image Sequence Coding", Michael Orchard, SPIE vol. 1199 Visual Communications and Image Processing IV (1989) pp. 248–258.
"Blockmatching Motion Estimation Algorithms–New Results", H. Gharavi and Mike Mills, IEEE Transactions on Circuits and Systems, vol. 37 No. 5, May, 1990 pp. 649–651.
"A Fast Feature–Based Block Matching Algorithm Using Integral Projections" Joon–Seek Kim, and Rae–Hong Park, IEEE Journal on Selected Areas in Communications, vol. 10, No. 5, Jun., 1992 pp., 968–971.
"Motion–Compensated Interframe for Video Conferencing" T. Koga, K. Iinuma, A. Hirano, Y.IIjima and T. Ishiguro, Nippon Electric Company, Ltd. Kawasaki, Japan, IEEE, 1981.
"Dispalcement Measurement and Its Application in Interframe Image Coding", Jaswant R. Jain, and Anil K. Jain, IEEE Transactions on Communications, vol. Com–29, No. 12, Dec., 1991 pp. 1799–1808.
"One–Dimensional Full Search Motion Estimation Algorithm for Video Coding", IEEE Transactions on Circuits and Systems for Video Technology, vol. 4, No. 5, Oct., 1994 pp. 504–509.
"An Efficient Parrallel Motion Estimation Algorithm for Digital Image Processing", Liang–Gee chen, Wai–Ting Chen, Yeu–Shen Jehng, and Tzi–Dar Chiueh, IEEE Transactions on Circuits and Systems for Video Technology, vol. 1, No. 4, Dec., 1991 pp. 378–385.
"Motion Compensated Interframe Image Prediction", S. Kappagantula and K.R. Ral, IEEE Transactions on Communications, vol. Com–33, No. 9, Sep., 1985 pp. 1011–1015.
"Predictive Coding Based on Efficient Motion Estimation", Ram Srinivasan and K.R. Rao, IEEE Transactions on Comnmunications, vol. Com–33, No. 8, Aug. 1985 pp. 888–896.

*Primary Examiner*—Douglas W. Olms
*Assistant Examiner*—A. Bnimoussa
*Attorney, Agent, or Firm*—Darleen J. Stockley

[57] ABSTRACT

A complexity scalable device (100), method (300, 400) and digital video encoder (200) estimate a frame-to-frame motion vector of an image block of pixels to be encoded with adaptive threshold termination utilizing a novel dynamic threshold value determination. A dynamic threshold selector dynamically determines a threshold value in accordance with a predetermined scheme based on the quantization stepsize QP, and an adaptive motion vector determiner utilizes an original block, a reference frame, and the threshold value for adaptively estimating the frame-to-frame motion vector.

14 Claims, 2 Drawing Sheets

DEVICE, METHOD AND DIGITAL VIDEO ENCODER OF COMPLEXITY SCALABLE BLOCK-MATCHING MOTION ESTIMATION UTILIZING ADAPTIVE THRESHOLD TERMINATION

FIELD OF THE INVENTION

This invention relates generally to digital video compression, and more particularly to block-matching motion estimation in a video compression system.

BACKGROUND

Digital video compression is one of the most critical enabling technologies for multimedia. Because of the huge data rate of raw digital video data, compression has to be applied to compress a video signal before it can be transmitted or stored. The DPCM/DCT (DPCM is Differential Pulse-Code Modulation and DCT is Discrete Cosine Transform) hybrid coding technique has proved to be the most effective and successful for video compression. All the current international standards, namely ITU H.261 and H.263, ISO MPEG I and II, have adopted this coding structure. In a hybrid video coder, prediction coding is used to reduce the temporal redundancy, and DCT is applied to the prediction error signal to eliminate the remaining spatial redundancy. Due to the inherent existence of moving objects in video signals, motion compensated prediction is usually exploited in the temporal prediction.

Motion estimation can be classified into two categories, namely the block-matching and pel-recursive (See H. G. Musmann, P. Hirsch, and H. J. Grallert, "Advances in picture coding," *Proc. IEEE*, pp. 523–548, April 1985, and M. Orchard, "A comparison of techniques for estimating block motion in image sequence coding," *Proc. SPIE Visual Commun. and Image Processing*, pp. 248–258, 1989). Because hybrid video coders are block-based and the block-matching method needs much less complexity than pel-recursive to implement, only block matching has been considered for current practical video compression systems.

In hybrid coding, a video frame to be encoded is partitioned into non-overlapping rectangular, or most commonly, square blocks of pixels. For each of these blocks, the best matching block is searched from a reference frame in a predetermined search window according to a predetermined matching error criterion. Then the matched block is used to predict the current block, and the prediction error block is further processed and transmitted to the decoder. The relative shifts in the horizontal and vertical directions of the matched block with respect to the original block are grouped and referred to as the motion vector of the original block, which is also transmitted to the decoder.

The most straightforward method to search for the motion vector is the brute-force, full search (FS) method. In the FS method, all the possible candidate locations in the search window are used to find the best match. Although this method can produce the best motion vector according to the predetermined matching criterion, it is usually too complicated in practice to implement for real-time applications at a reasonable cost. To this end, various reduced complexity methods have been proposed and studied to either reduce the complexity of evaluating the match error at each search location or to reduce the number of search locations, or both.

Among the various matching error criteria used, the mean absolute difference (MAD) is the most favored one due to its relatively smaller implementation complexity than that of the mean square error (MSE), while providing the similar coding performance (see, e.g. H. G. Musmann, P. Hirsch, and H.-J. Grallert, "Advances in picture coding," *Proc. IEEE*, pp. 523–548, April 1985). The MAD is computed by first summing the absolute value of the luminance difference between the current block and the matching block in the reference frame over all the pixels in the block and then dividing the sum by the number of pixels in the block. To reduce the computational complexity of MAD, Koga et al. proposed subsampling the image before performing motion estimation (see, e.g. T. Koga, K. Linuma, A. Hirano, Y. Iijima, and T. Ishiguro, "Motion-compensated interframe coding for video conferencing," *Proc. Nat. Telecommun. Conf.*, pp. G5.3.1–G5.3.5, New Orleans, La., December 1981). However, such a direct pixel-decimation technique usually leads to noticeable performance degradation. An alternative subsampling method has been proposed which uses the same number of pixels for computing the MAD but uses different subset of the pixels at different search locations (see, e.g., B. Liu and A. Zaccarin, "New fast algorithms for the estimation of block motion vectors," *IEEE Trans. CAS Video Tech.*, pp. 148–157, April 1993). Instead of MAD, Pel Difference Classification (PDC) was proposed (see, e.g. H. Gharavi, "Motion estimator for video coder," U.S. Pat. No. 5,200,820, April 1993; and H. Gharavi and M. Mills, "Blockmatching motion estimation algorithms—new results," *IEEE Trans. CAS.*, pp. 649–651, May 1990). PDC counts the number of matched pixels between the two blocks. If the absolute of the luminance difference between two pixels is smaller than a predetermined threshold, the pixel is identified as matched; otherwise, it is classified as unmatched. Another matching criterion is based on the integral projections (see, e.g., J. S. Kim and R. H. Park, "A fast feature-based block matching algorithm using integral projections," *IEEE J. Selected Areas Comm.*, pp. 968–971, June 1992). In this method, the matching criterion is computed as the sum of the absolute difference between the integral projections along the horizontal and vertical directions of the two blocks.

On the other hand, instead of searching all the candidate locations, only some subset of those positions is searched. Methods along this line include the three step search (see, e.g. T. Koga, K. Linuma, A. Hirano, Y. Iijima, and T. Ishiguro, "Motion-compensated interframe coding for video conferencing," *Proc. Nat. Telecommun. Conf.*, pp. G5.3.1–G5.3.5, New Orleans, La., December 1981); the 2D-logarithmic search (see, e.g., J. R. Jain and A. K. Jain, "Displacement measurement and its application in interframe image coding," *IEEE Trans. Commun.*, pp. 1799–1808, December 1981); the one-dimensional full search (see, e.g., M.-J. Chen, L.-G. Chen, and T.-D. Chiueh, "One-dimensional full search motion estimation method for video coding," *IEEE Trans. CAS Video Tech.*, pp. 504–509, October 1994); the one-dimensional three step search (see, e.g., L.-G. Chen, W.-T. Chen, Y.-S. Jehng, and T.-D. Chiueh, "An efficient parallel motion estimation method for digital image processing," *IEEE Trans. CAS Video Tech.*, pp. 378–385, December 1991); the conjugate direction search or one-at-a-time search (see, e.g., R. Srinivasan and K. R. Rao, "Predictive coding based on efficient motion estimation," *IEEE Trans. Commun.*, pp. 888–895, August 1985); the improved 2D-logarithmic method (see, e.g., S. Kappagantula and K. R. Rao, "Motion compensated interframe image prediction," *IEEE Trans. Commun.*, pp. 1011–1015, September 1985), and the orthogonal search with fixed stepsize (see, e.g., M. Keith, "Method for optimizing image motion estimation," U.S. Pat. No. 5,329,318, July 1994). In the last method, the search process is terminated if the matching error stops decreasing or the assigned machine cycles are used up.

In all of the above-mentioned methods, the objective is to find the best matching block with the minimum matching error. They do not any information from the other part of an video encoder, such as the quantization step size and buffer fullness. However, in practical video compression, the ultimate goal is not to minimize the matching error but to optimize the coded video quality under the constraints of a given channel bandwidth and processing power.

Under certain circumstances, it is not necessary to find the best match since it neither improves the coded picture quality nor reduces the bitrate. For example, where a large quantization stepsize is to be used to encode the current block, there is no need to find the best matching block since the prediction error will be processed with the large quantization stepsize and typically a better search does not necessarily improve the picture quality nor reduce the bitrate. Finding the best matching block cannot be benefitted but lead to computation resource waste.

Thus, there is a need for method, device and digital video encoder of a block-matching motion estimation that utilize information from the coding process to reduce the impleiementation complexity, e.g., the motion search process should be terminated with some adaptive threshold termination control.

DETAILED DESCRIPTION OF A PREFERRED EMBODIMENT

The motion estimation method, device and digital video encoder of the present invention terminate the search process once the matching error is less than a predetermined threshold. The threshold for each block is adapted to the quantization stepsize to be applied for coding the block and where selected, to the available processing quota. By changing the threshold function, the complexity of the method, device and digital video encoder to implement the motion estimator is made scalable. Thus, the processing quota to be allotted to the device for motion estimation may be predetermined based on other projected processing needs of a system.

Figure 1:
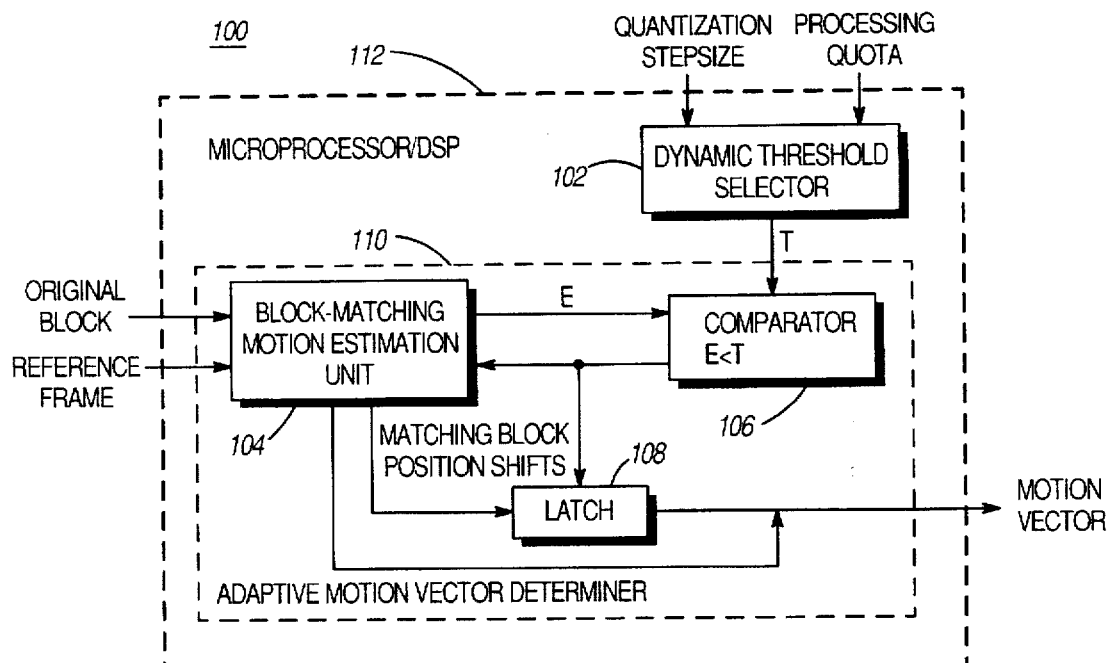
FIG. 1 is a block diagram schematic of one embodiment of a device in accordance with the present invention.

FIG. 1, numeral 100, is a block diagram of one embodiment of a motion estimation device in accordance with the present invention. The motion estimation device is complexity scalable for estimating a frame-to-frame motion vector of an image block of pixels to be encoded with adaptive threshold termination and includes: A) a dynamic threshold selector (102), operably coupled to receive a quantization stepsize QP, for dynamically determining a threshold value in accordance with a predetermined scheme based on the quantization stepsize QP (described further below); and B) an adaptive motion vector determiner (110), operably coupled to receive an original block, a reference frame, and the threshold value, for utilizing the threshold value to adaptively estimate the frame-to-frame motion vector.

In another embodiment, the device includes a dynamic threshold selector (102), a block-matching motion estimation unit (104), a comparator (106), and a latch (108). The dynamic threshold selector (102) receives the quantization stepsize and, where selected, the processing quota and outputs a threshold value T according to a predetermined function. The block-matching motion estimation unit (104) receives the current original block to be coded and the reference frame as input and searches for the motion vector using a predetermined prior art search method in a predetermined search window in the reference frame (for example, the full search, the three step search, etc.). At each search location, the matching error E is generated and is compared to the threshold T by the comparator (106). If E is less than T, the comparator (106) sends a signal to the latch (108) and the relative shifts of the matching-block with respect to the original block are latched through a latch (108) as the final motion vector, and the search process is terminated. If E is greater or equal to T, then the matching block-matching motion estimation unit (104) proceeds to the next search location. This process is repeated until either the latch (108) is latched or all the search locations are exhausted.

The processing complexity of the device of the present invention depends on the search method used and the dynamic threshold selector (102). Once the search method is fixed, the processing complexity is determined solely by the dynamic threshold selector (102). By dynamically adjusting the function of the threshold T in terms of the quantization stepsize and, where selected, the processing quota, the system is made complexity scalable. Complexity scalability enables the user to maximize processing power usage while concomitantly optimizing coded video quality.

In one embodiment, the function of the dynamic threshold selector (102) is to generate a threshold value T according to a linear function of the quantization stepsize (or parameter) QP and the two coefficients of the linear function can be tuned by the processing quota PQ, i.e., $$T = a^* QP + b$$

where a and b are monotonically non-increasing functions of PQ. Either a or b, or both can be a constant or variable. Where T is selected to be a function of QP only, a and b may be preselected values.

Typically, the device of the present invention is implemented utilizing a microprocessor (112) such as a Pentium, a 486 microprocessor, or a digital signal processor such as a Motorola 56100, or a dedicated hardware such as an ASIC (Application Specific Integrated Circuit) chip.

Figure 2:
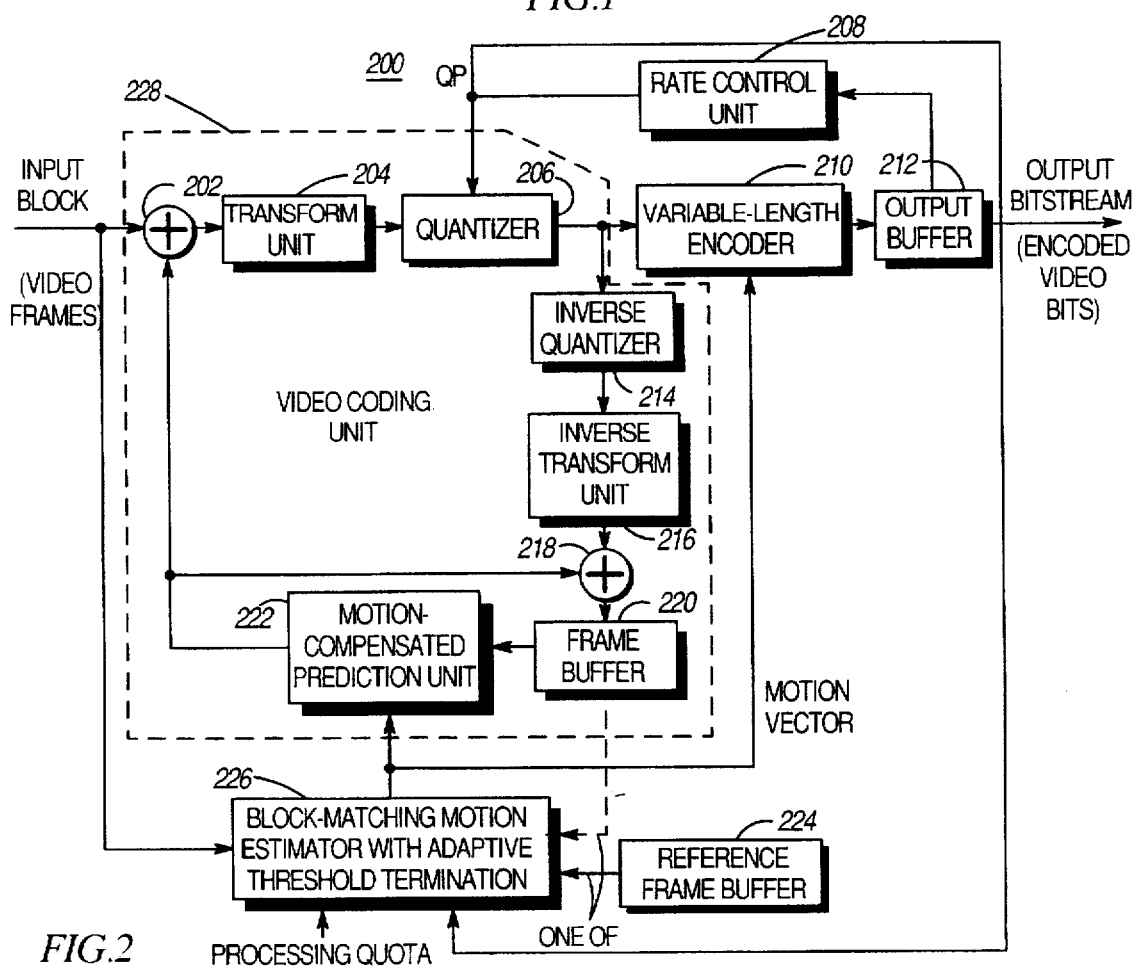
FIG. 2 is a block diagram schematic of a digital video encoder which employs the motion estimation unit in accordance with the present invention.

FIG. 2, numeral 200, is a block diagram of a video encoder which employs the device of the present invention. The encoder includes: a first adder (202), operably coupled to receive video frames (input block) and to receive the output from a motion-compensated predictor (MCP) (222); a transform unit (204), operably coupled to the first adder (202); a quantizer (206) operably coupled to the transform unit and to a rate control unit (208); a variable-length encoder (210) operably coupled to the quantizer (206) and to receive a motion vector from a block-matching motion estimator with adaptive threshold termination; an output buffer (212) operably coupled to the variable-length encoder (210), for outputting encoded video bits; an inverse quantizer unit (214) operably coupled to the quantizer (206); an inverse transform unit (216), operably coupled to the inverse quantizer (214); a second adder (218), operably coupled to the inverse transform unit (216) and to the output of the MCP (222); a frame buffer (220), operably coupled to the second adder (218), for storing a reconstructed block which serves as a reconstructed frame for use in the coding of a next video frame; a reference frame buffer (224), for providing reference frames to the block-matching motion estimator (226); the block-matching motion estimator with adaptive threshold termination (226) of the present invention operably coupled to the reference frame buffer (224) and the rate control unit (208), to receive input video frames, and, where selected, to receive processing quota information; a motion compensated prediction unit (222), operably coupled to the frame buffer (220) and to the block-matching motion estimator with adaptive threshold termination (226).

The first adder (202), the motion-compensated predictor (MCP) (222), the transform unit (204), the quantizer (206), the inverse quantizer unit (214), the inverse transform unit (216), the second adder (218), the frame buffer (220), and the motion-compensated predictor (222) typically embody the video coding means (228).

The encoder in FIG. 2 operates in the following manner: a video frame to be coded is first segmented into non-overlapping blocks and each of these blocks is coded separately. To encode a block, the block-matching motion estimator (226) utilizes the scheme in accordance with the present invention described above to determine a motion vector based on the image stored in the reference frame buffer (224). Where desired, the (prediction) frame buffer (220) may be utilized as the reference frame buffer (224). At the motion-compensated prediction unit (222), an image block is specified by the motion vector from the block-matching motion estimator (226).

At the first adder (702), the prediction block is subtracted from the input block to be coded to generate a prediction error block. A transform is then applied to the prediction error block. The most popular transform is the Discrete Cosine Transform (DCT). Other transforms such as subband and wavelet can also be applied. Then the coefficients of the transform are quantized using the quantization stepsize or parameter (QP) generated by the rate control unit (208). The prediction error block can also be quantized directly. In this case, the transform is an identity transform, i.e., its output is the same as its input. The variable-length encoder (210) is operably coupled to perform the lossless encoding of the quantized transform coefficient block and the motion vector. The output buffer (212) and the rate control unit (208) are usually used to generate a bitstream of predetermined bitrate characteristics such as constant bitrate (CBR) or variable bitrate (VBR). The output buffer (212) is operably coupled to receive the binary bits output from the variable-length encoder. The rate control unit (208) is operably coupled to monitor the buffer fullness of the output buffer (212) and to adjust the quantization stepsize of the quantizer (206) to ensure that the output buffer suffers neither overflow nor underflow.

The quantized transform coefficients block output from the quantizer (206) is also inverse quantized by the inverse quantizer (214) and undergoes an inverse transform (216). At the second adder (218), the outputs from the inverse transform unit (216) and the MCP (222) are summed to form the reconstructed block, which is stored in the frame buffer (220) to form a reconstructed frame for use in the coding of the next video frame.

Figure 3:
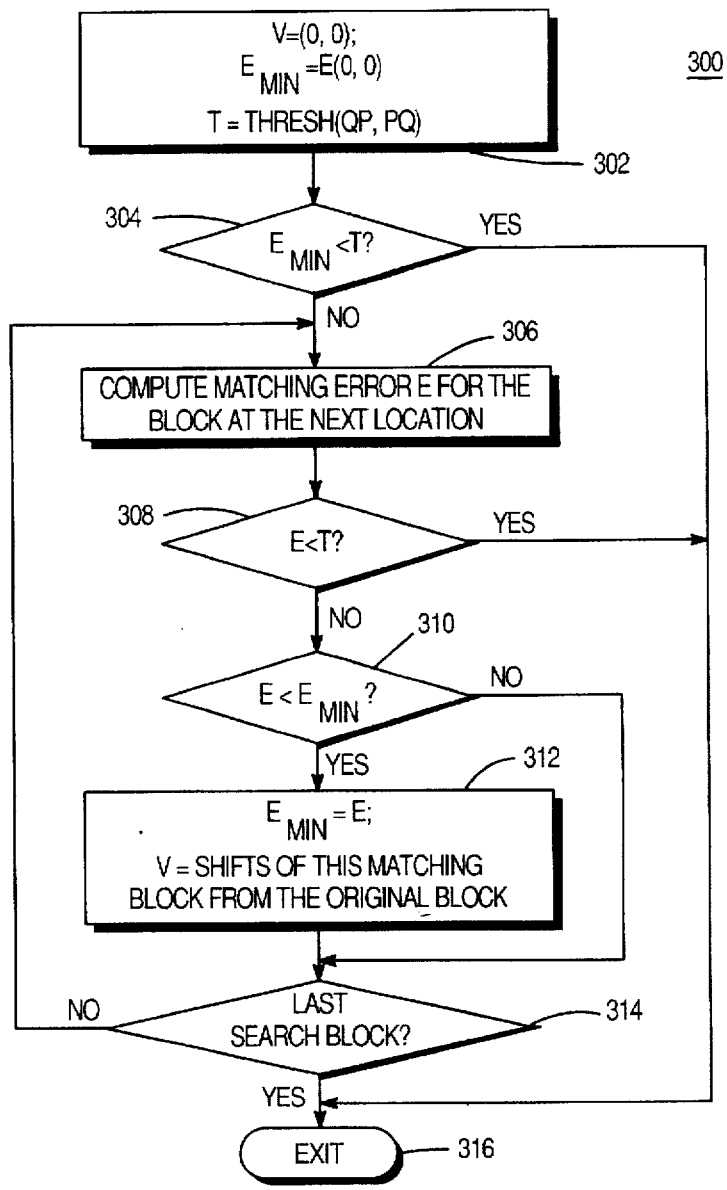
FIG. 3 is a flowchart of one embodiment of the steps of a method in accordance with the present invention.

FIG. 3, numeral 300, is a flowchart of one embodiment of the steps of a method in accordance with the present invention. The method utilizes a novel dynamic threshold selector in providing steps to estimate the motion vector of an original video block to be coded from a predetermined search window in a reference video frame. The motion vector V is initialized as (0,0) (302). The parameter $E_{min}$ is initialized as E(0,0), which is the matching error between the original block and the corresponding block in the reference frame at the same location. The threshold value T is determined by the function of the quantization parameter QP and, where selected, the processing quota PQ, in terms of the relation of T=Thresh(QP, PQ). One form of Thresh(QP, PQ) is a linear function of QP, i.e., $T=a*QP+b$ where a and b are two separate monotonically non-increasing function of PQ. As described more fully above, where selected, T may be dependent only on QP. Then, $E_{min}$ is compared (304) to the threshold T. If $E_{min}$ is less than T, the motion estimation process is terminated (316). Otherwise, according to a predetermined search method, a matching block is obtained at a next location from the reference frame. Then, the matching error E is computed (306) in accordance with a predetermined matching error criterion and is compared (308) to the threshold T. If E is less than T, the motion estimation process is terminated (316). Otherwise, E is compared to the stored value $E_{min}$ (310). If E is less than $E_{min}$, then $E_{min}$ is replaced by E and the motion vector V is replaced with the relative shifts of the current matching block from the original block to be coded (312). If all the candidate search locations are searched (314), then the motion estimation process is ended (316) and the V is declared as the motion vector. Where all candidate search locations have not yet been searched, the motion estimation process recycles to obtaining a matching block at a next location from the reference frame (304). Where all candidate search locations are searched, the search process is terminated.

Figure 4:
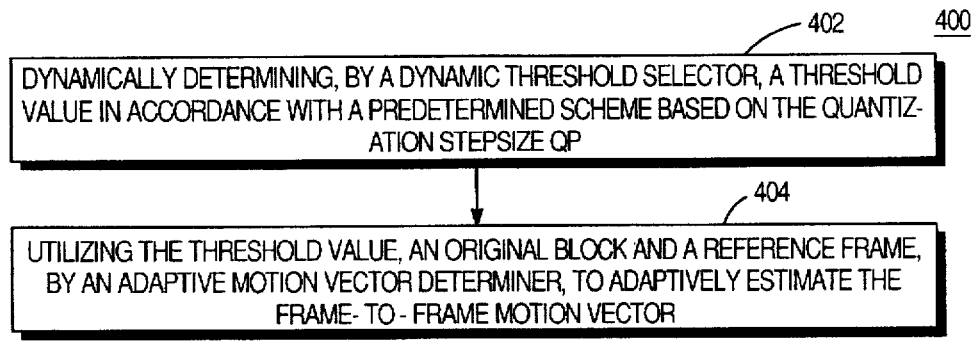
FIG. 4 is a flow chart of one implementation of the steps of the method of the present invention.

FIG. 4, numeral 400, is a flow chart of one implementation of the steps of the method of the present invention. The method includes the steps of: A) dynamically determining (402), by a dynamic threshold selector, a threshold value in accordance with a predetermined scheme based on the quantization stepsize QP; and B) utilizing the threshold value, an original block and a reference frame, by an adaptive motion vector determiner, to adaptively estimate (404) the frame-to-frame motion vector.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A complexity scalable device for estimating a frame-to-frame motion vector of an image block of pixels to be encoded with adaptive threshold termination, comprising:

A) a dynamic threshold selector, operably coupled to receive a quantization stepsize QP, for dynamically determining a threshold value in accordance with a predetermined scheme based on the quantization stepsize QP; and B) an adaptive motion vector determiner, operably coupled to receive an original block, a reference frame, and the threshold value, for utilizing the threshold value to adaptively estimate the frame-to-frame motion vector.

2. The complexity scalable device of claim 1 wherein the predetermined scheme includes dynamically determining a threshold value T according to a linear function of a form:

$T=a*QP+b$ where a and b are one of:

A) monotonically non-increasing preselected functions of a predetermined processing quota PQ; and

7

B) predetermined constants/variables.

3. The complexity scalable device of claim 1 wherein the adaptive motion vector determiner includes:
A) a block-matching motion estimation unit, operably coupled to receive an original block of pixels to be encoded, a reference frame, an output signal from a comparator, for searching for a motion vector of the original block in the reference frame, in accordance with a predetermined search scheme and matching error criterion, and generating a matching error and relative shifts of the matching block with respect to the original block at each search point;
B) the comparator, operably coupled to the dynamic threshold selector and the block-matching motion estimation unit, for comparing the threshold value and the matching error, and when the matching error is less than the threshold, generating a signal to a latch and the block-matching motion estimation unit to terminate the operation of the block-matching motion estimation unit for the image block of pixels; and
C) the latch, operably coupled to the comparator and the block-matching motion estimation unit, for passing matching block position shifts from the block-matching motion estimation unit as a motion vector upon receiving the signal from the comparator.

4. The complexity scalable device of claim 1 wherein the device is implemented utilizing one of:
A) a microprocessor; and
B) a digital signal processor
C) a dedicated hardware.

5. A complexity scalable device in a digital video encoder for estimating a frame-to-frame motion vector of an image block of pixels to be encoded from a reference video frame with adaptive threshold termination, comprising:
A) a dynamic threshold selector, operably coupled to receive a quantization stepsize, for determining a threshold value;
B) a block-matching motion estimation unit, operably coupled to receive an original block of pixels to be encoded, a reference frame/frame buffer, an output signal from a comparator, for searching for a motion vector of the original block in the reference frame, in accordance with a predetermined search scheme and matching error criterion, and generating a matching error and relative shifts of the matching block with respect to the original block at each search point;
C) a comparator, operably coupled to the threshold selector and the block-matching motion estimation unit, for comparing the threshold and the matching error, and when the matching error is less than the threshold, generating a signal to a latch and the block-matching motion estimation unit to terminate the operation of the block-matching motion estimation unit for this block;
D) a latch, operably coupled to the comparator and the block-matching motion estimation unit, for passing the matching block position shifts from the block-matching motion estimation unit as a motion vector upon receiving the signal from the comparator.

6. The complexity scalable device of claim 5 wherein the predetermined scheme includes dynamically determining a threshold value T according to a linear function of a form:

$$T=a*QP+b$$

where a and b are one of:
A) monotonically non-increasing preselected functions of a predetermined processing quota PQ; and

8

B) predetermined constants/variables.

7. A digital video encoder comprising:
A) a block-matching motion estimator with adaptive threshold termination which estimates a motion vector of a original block to be coded from a reference frame; the said motion estimator comprising:
A1) a dynamic threshold selector, operably coupled to receive the quantization stepsize from a rate control unit and, where selected, a predetermined processing quota from a host, for determining a threshold value;
A2) a block-matching motion estimation unit, operably coupled to receive an original block of pixels to be encoded, a reference frame, an output signal from a comparator, for searching for a motion vector of the original block in the reference frame, in accordance with a predetermined search scheme and matching error criterion, and generating a matching error and relative shifts of the matching block with respect to the original block at each search point;
A3) a comparator, operably coupled to the dynamic threshold selector and the block-matching motion estimation unit, for comparing the threshold value and the matching error, and when the matching error is less than the threshold, generating a signal to a latch and the block-matching motion estimation unit to terminate the operation of the block-matching motion estimation unit for this block;
A4) a latch, operably coupled to the comparator and the block-matching motion estimation unit, for passing the matching block position shifts from the block-matching motion estimation unit as a motion vector to a motion-compensated predictor upon receiving the signal from the comparator;
B) video coding means, operably coupled to receive the input block/video frames, an output of a rate control unit, and a motion vector from the block-matching motion estimator with adaptive threshold termination, for encoding the difference between the original block and motion-compensated prediction block using the motion vector to provide a prediction error block;
C) a variable length encoder, operably coupled to the video coding means, for encoding the prediction error block and the motion vector generated by the block-matching motion estimator;
D) an output buffer, operably coupled to the variable-length encoder, for receiving binary bits from the variable length encoder and outputting binary bits to the channel;
E) a rate control unit, operably coupled to the output buffer, for monitoring the fullness of the buffer and outputting a quantization stepsize to the quantizer of the video coding means and the block-matching motion estimation unit.

8. The complexity scalable device of claim 7 wherein the predetermined scheme includes dynamically determining a threshold value T according to a linear function of a form:

$$T=a*QP+b$$

where a and b are one of:
A) monotonically non-increasing preselected functions of a predetermined processing quota PQ; and
B) predetermined constants/variables.

9. A complexity scalable method in a digital video encoder for estimating the frame-to-frame motion vector V of an original image block of pixels to be encoded from a reference video frame with adaptive threshold termination, the method comprising the steps of:

A) initializing the motion vector V with (0,0) and a value $E_{min}$ with E(0,0), where E(0,0) is the matching error between the original block and the matching block at the same location of the original block.

B) determining a threshold value T in terms of a function of a quantization stepsize QP in accordance with a predetermined scheme;

C) Comparing $E_{min}$ to T and where $E_{min}$ is less than T, terminating the process;

D) computing a matching error E according to the predetermined matching error criterion between the original block and a matching block at a next search location in the reference frame according to a predetermined search method;

E) comparing E to T and where E is less than T, terminating the process;

F) where E is greater than or equal to T, comparing E with $E_{min}$;

G) Where E is greater than or equal to $E_{min}$, proceeding to step I;

H) where E is less than $E_{min}$, replacing $E_{min}$ with E and replacing V with the relative position shifts of the matching block with respect to the original block;

I) determining whether the matching block is a last search block for the predetermined search method;

J) where the matching block is the last search block for the predetermined search method, terminating the process and outputting the contents of the motion vector memory as a final motion vector of the block;

K) where the matching block fails to be the last search block for the predetermined search method, recycling to step C.

10. The method of claim 9 wherein the predetermined scheme includes dynamically determining a threshold value T according to a linear function of a form:

$$T=a*QP+b$$

where a and b are one of:

A) monotonically non-increasing preselected functions of a predetermined processing quota PQ; and B) predetermined constants/variables.

11. A method for estimating a frame-to-frame motion vector of an image block of pixels to be encoded with adaptive threshold termination, comprising:

A) dynamically determining, by a dynamic threshold selector, a threshold value in accordance with a predetermined scheme based on the quantization stepsize QP; and B) utilizing the threshold value, an original block and a reference frame, by an adaptive motion vector determiner, to adaptively estimate the frame-to-frame motion vector.

12. The method of claim 11 wherein the predetermined scheme includes dynamically determining a threshold value T according to a linear function of a form:

$$T=a*QP+b$$

where a and b are one of:

A) monotonically non-increasing preselected functions of a predetermined processing quota PQ; and B) predetermined constants/variables.

13. The method of claim 11 wherein the adaptive motion vector determiner includes:

A) searching, by a block-matching motion estimation unit, utilizing an original block of pixels to be encoded, a reference frame, and an output signal from a comparator, for a motion vector of the original block in the reference frame, in accordance with a predetermined search scheme and matching error criterion, and generating a matching error and relative shifts of the matching block with respect to the original block at each search point;

B) comparing, by the comparator, the threshold value and the matching error, and when the matching error is less than the threshold, generating a signal to a latch and the block-matching motion estimation unit to terminate the operation of the block-matching motion estimation unit for the image block of pixels; and C) passing, by the latch, matching block position shifts from the block-matching motion estimation unit as a motion vector upon receiving the signal from the comparator.

14. The method of claim 11 wherein the method is implemented utilizing one of:

A) a microprocessor; and

B) a digital signal processor;

C) a dedicated hardware.

* * * * *